J. L. VALENTE DA CRUZ.
MAGNETOMETER FOR MEASURING WEAK MAGNETIC FIELDS.
APPLICATION FILED APR. 23, 1918.
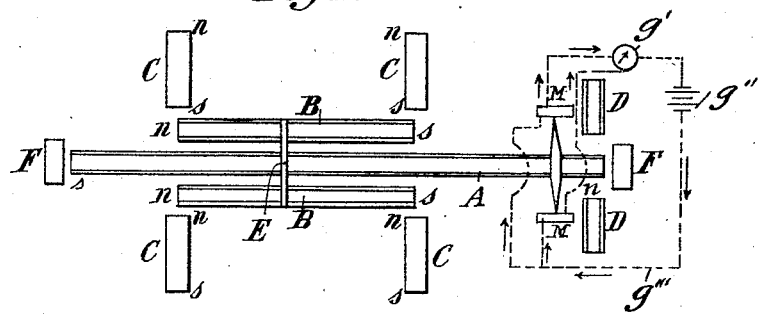
Fig:1.
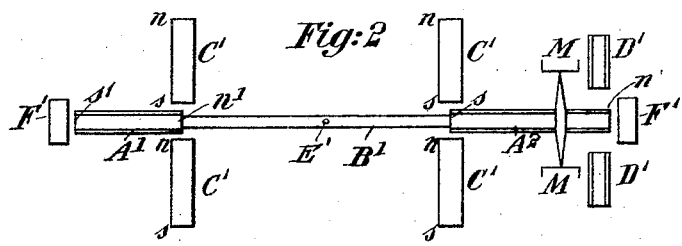
Fig:2.
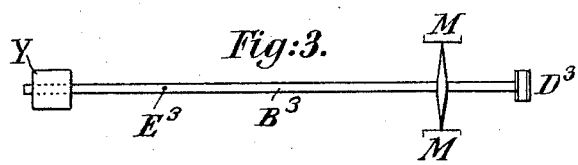
Fig:3.
Inventor
J. L. Valente da Cruz
by his Attorney

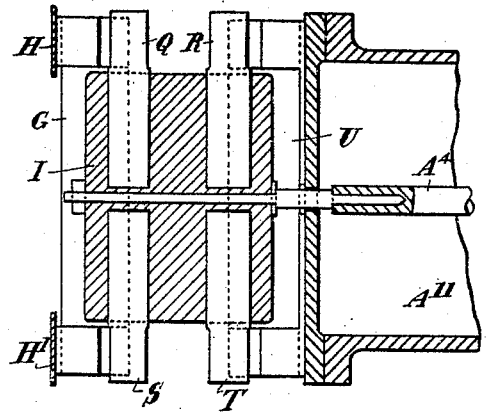
Fig:4.
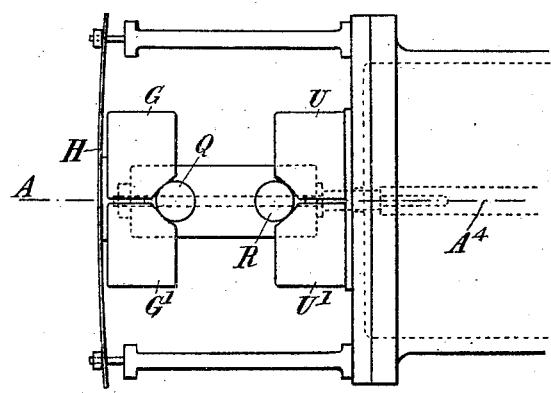
Fig:5.
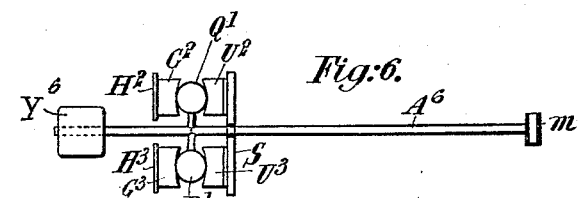
Fig:6.
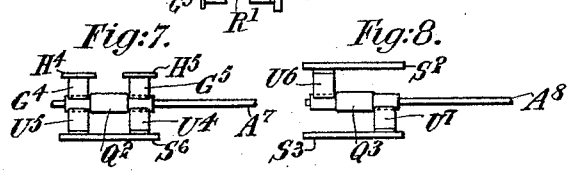
Fig:7.   Fig:8.
Inventor
J. L. Valente da Cruz
by his Attorney.

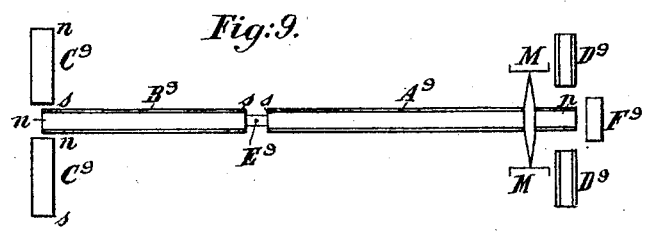
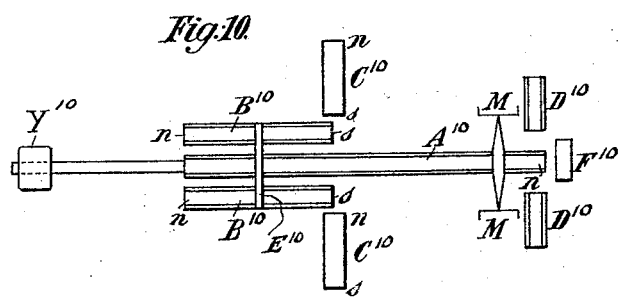
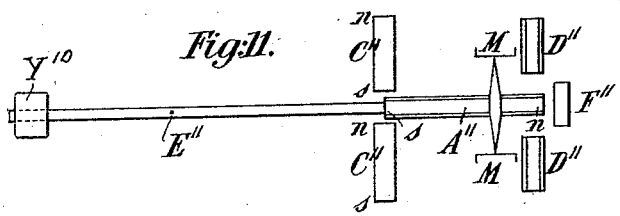

J. L. VALENTE DA CRUZ.
MAGNETOMETER FOR MEASURING WEAK MAGNETIC FIELDS.
APPLICATION FILED APR. 23, 1918.
1,417,803.
Patented May 30, 1922.
4 SHEETS—SHEET 4.
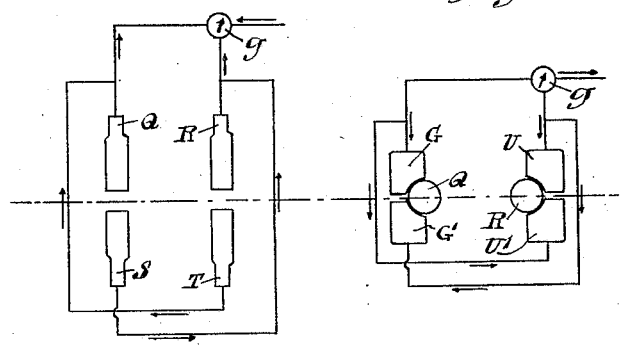
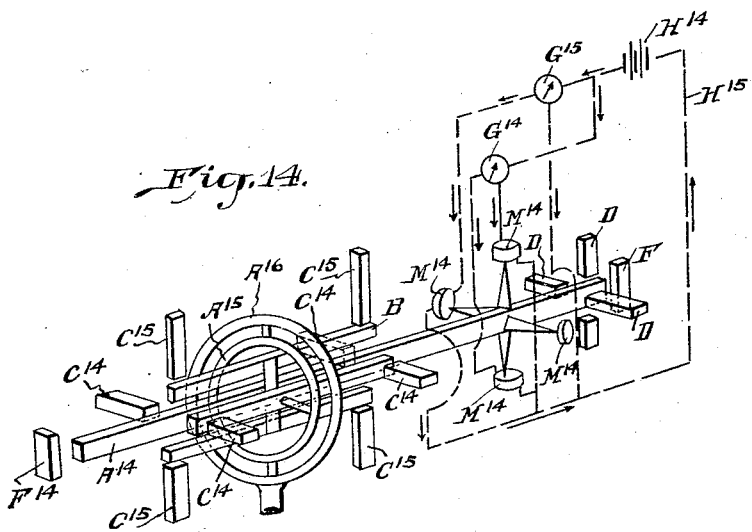
Inventor:
Julio Loes Valente da Cruz,
By R. Haddan,
Attorney.

UNITED STATES PATENT OFFICE.

JULIO LOPES VALENTE DA CRUZ, OF NEWCASTLE-UPON-TYNE, ENGLAND.

MAGNETOMETER FOR MEASURING WEAK MAGNETIC FIELDS.

1,417,803. Specification of Letters Patent. Patented May 30, 1922.

Application filed April 23, 1918. Serial No. 230,353.

*To all whom it may concern:*

Be it known that I, JULIO LOPES VALENTE DA CRUZ, a citizen of the Portuguese Republic, residing at Newcastle-upon-Tyne, in England, have invented certain new and useful Improvements in Magnetometers for Measuring Weak Magnetic Fields, of which the following is a specification.

This invention relates to improvements in apparatus for detecting and measuring weak magnetic fields or forces, which latter may be continuous or alternate and the sources thereof distant or close to the apparatus.

The object of the invention is to improve apparatus for detecting and measuring weak magnetic fields or forces, to increase the sensitiveness of such apparatus, and provide an apparatus of this character that will be highly sensitive and efficient in use.

The invention, with other objects and advantages thereof, and the particular construction, combinations and arrangements of parts comprising the same will be understood from the hereinafter contained detailed description, when considered in connection with the accompanying drawings, forming part hereof, and illustrating embodiments of the invention.

In the drawings:—

Figure 1 is a top plan view illustrating diagrammatically an apparatus constructed in accordance with the present invention.

Figure 2 is a similar view of a modified construction, without the electric circuit and indicating means.

Figure 3 is a like view illustrating another modification.

Figure 4 is a longitudinal section of another modification.

Figure 5 is a plan of the modified form of apparatus illustrated in Fig. 4.

Figure 6 illustrates in plan a further modification.

Figures 7, 8, 9, 10 and 11 are similar diagrammatic views illustrating other modifications.

Figures 12 and 13 illustrate diagrammatically the electric circuit connections with the abutments, and the indicating mechanism.

Figure 14 is a perspective view illustrating another embodiment of the invention.

The invention comprehends an improved apparatus for detecting and measuring weak magnetic forces, including a magnet, means for rendering said magnet astatic to earth, oppositely directed abutments against which said magnet will exert variable pressure under the influence of deflecting magnetic force, means for causing an electrical current to pass through said abutments, whereby the intensity of the current is subjected to variation corresponding to variations of pressure on the abutments, and means for giving indication of such current variations.

Referring particularly to Fig. 1 of the drawings, the construction shown comprises a pivoted magnet A, whose tendency to deflect under the action of earth in the plane of the apparatus is partly compensated by means of magnets B, tending to deflect in the opposite direction and rigidly connected to the magnet A, and partly by increasing the said tendency to deflect in the opposite direction by means of a plurality of soft iron bars C symmetrically disposed at each side of the magnet B and at right angles to the latter. The effect of the soft iron bars C may be assisted by the arrangement of soft iron bars F placed across the poles of the magnet A and at right angles to the latter. The magnets A, B are shown as pivoted on an axis perpendicular to the diagram at E.

The apparatus thus compensated is astatic to earth in the plane of the diagram, i. e., in that plane in which the magnet A tends to rock about its pivot but is not astatic to any other source of magnetism. The required stability of the whole pivoted system of magnets A, B is insured by means of two magnets or coils D, disposed one at each side of one pole of the magnet A and both acting either by attraction or repulsion of such pole, said magnets or coils D being adjustable towards and away from the latter.

The effect of any weak magnetic force, if continuous, can be measured by the difference of pressure exerted by the pivoted system of magnets A, B, on two fixed microphones M, M disposed one at each side of one pole of the magnet A, which microphones serve to hold the pivoted system of magnets A, B, in the center line between the soft iron bars C, whilst said difference of pressure may be ascertained by the difference of the intensity of an electric current passing through the microphones M, M, or by the difference of sound if the microphones are caused to vibrate. $g'$ designates a galvanometer acting as a differential apparatus to measure the difference of intensity of the current supplied to the microphones M, M, said galvanometer being connected with the microphones M, M, and with a battery $g''$ or other suitable source of electric power by circuits $g'''$, as shown.

The effect of the weak magnetic force can also be measured by determining the magnitude of the displacement of one of the magnets D necessary to overcome the disturbing force and restore the equilibrium of the pivoted system of magnets A, B, in the center line between the microphones. Should, however, the magnetic force be a vibrating or alternate one, the amplitude of its vibration may be measured by the sound produced by the microphones, the vibration being transmitted to the microphones by the pivoted system of magnets.

As an alternative to the construction illustrated in Fig. 1, the pivoted magnet may be so arranged as to have poles tending to deflect the same in relatively opposite directions under the action of earth. Such a modified construction is shown diagrammatically in Fig. 2 of the drawings, in which $A'$, $A^2$ designate two magnets connected together by a non-magnetic bar $B'$, poles $s$, $n'$ of said magnets $A'$, $A^2$ tending to oppose the poles $n$, $s'$. $E'$ designates the pivotal axis of the bar $B'$. The soft iron bars $C'$ are symmetrically arranged at each side of the poles $s$, $n'$, whose tendency to deflect the pivoted system of magnets is opposed to the deflecting tendency of the poles $n$, $s'$.

When the source of magnetic force to be measured can be placed close to the apparatus, it is unnecessary to render the latter astatic to earth, and the apparatus may take the form illustrated diagrammatically in Fig. 3 of the drawings, in which $B^3$ is a non-magnetic bar, one end of which has attached thereto a small magnet or coil $D^3$, on which latter the magnetic force acts, the bar being shown as held in position by two microphones M, M. Y designates a counterweight attached to the bar $B^3$ at the other end beyond the pivotal axis $E^3$. This arrangement is an improvement on telegraph or telephone relays with microphone contacts where a coil or coils placed in a strong magnetic field tend to rotate when a current passes through them, the strong magnetic field being suppressed in my construction and the pivoted or suspended magnet or coil $D^3$ being of constant pole strength and attracted or repelled by the magnetic force to be detected and measured.

In Figs. 4 and 5 of the drawings is illustrated another embodiment of the invention. This construction comprises a magnet $A^4$ disposed inside a casing $A^{11}$. The magnet $A^4$, in this instance, is not pivoted, one end being free and the other end supported in the following manner:

Attached to the end of the magnet $A^4$ outside of the casing $a^{11}$ is a fibre block I, in which are fixed four vertical rods Q, R, S, T, of carbon or other suitable material, symmetrically disposed, two at each side of the longitudinal axis of the magnet $A^4$, said carbon rods constituting the abutments in this particular form of the apparatus. The carbon rods R, T contact with two bearings formed by two blocks U, $U'$ of carbon or other suitable material, which are insulated from each other and fixed to the cover of the casing $A^{11}$, the block U forming half bearings for one side of the rods R, T, and the block $U'$ forming half bearings for the other side of said rods. Similarly, the rods Q, S contact with two bearings formed by two other blocks G, $G'$ of carbon or the like, also electrically insulated from each other. The latter are pressed against the rods Q, S and the rods R, T against their bearings U, $U'$ by suitable springs or equivalent means, as for instance by flexible plates H, $H'$. The pressure exerted by each plate H, $H'$ by which the magnet $A^4$ is held in position, should be approximately equal. The weight of the magnet is compensated by floats (not shown), of any suitable construction, operating in liquid placed in the casing $A^{11}$. The obliquely opposite pairs of carbon rods are electrically connected as shown in Fig. 13, i. e., the rod R being connected to the rod S, and the rod T to the rod Q, and the pairs of carbons R, S and T, Q thus formed are connected to the same circuit in parallel, the current entering the carbon bearings and passing from the latter to the carbon rods. The difference of intensity of the current supplied to these pairs of carbons is measured by a galvanometer $g$ acting as a differential apparatus. The half bearings U, $U'$ and G, $G'$ are also electrically connected in oblique pairs U to $G'$, and $U'$ to G, as shown in Fig. 12.

When no magnetic force is acting on the free end of the magnet $A^4$, all of the half bearings are subjected to an equal pressure by the springs H, $H'$, and consequently the intensity of the current passing in both pairs of carbon rods R, S, and T, Q, is equal. The intensity of the current received by the two pairs of half bearings U, $G'$ and $U'$ G, is also equal. When, however, a magnetic force acts on the free end of the magnet $A^4$, its horizontal component increases the pressure of the carbon rods on one pair of half bearings and relieves the pressure on the other pair, so that there is a variation of the intensity of the current in each half bearing, the intensity of the current in one pair of half bearings being increased, whilst the intensity in the other pair is decreased, and the intensity in both pairs of carbons connected in parallel R, S, and T, Q, remaining the same.

On the other hand, the perpendicular component of a magnetic force acting on the free end of the magnet $A^4$ causes an increase of pressure on the bearings corresponding to one of the diagonals of the rectangle formed by the four bearings (see Fig. 4) relieving at the same time the pressure on the bearings corresponding to the other diagonal, so that there is a variation of intensity of the current in each rod, with the result that the intensity of the current in one pair of rods is increased, and the intensity of the other pair is decreased, whilst the intensity of the current received by the two pairs of half bearings U, G' and U', G remains the same, the difference of the intensity being measured by the galvanometer. The deflection of the needles of the galvanometers indicates the difference of intensity corresponding to said vertical and horizontal components and the directions of the deflections indicates the direction of these components.

If only the horizontal component of the effect of a distant magnetic force is to be detected and measured, as would be the case with self-directing torpedoes used against surface vessels, or if the source of magnetic force can be placed close to the apparatus and in the same horizontal plane, the arrangement of carbons illustrated in Figs. 4 and 5 may be simplified as shown, by way of example, in Figs. 6 and 7 of the drawings. The modified construction illustrated in Fig. 6 comprises carbon rods Q', R' arranged one on each side of the rod $A^6$ and held in position by two split bearings, the half bearings $U^2$, $U^3$ being fixed to the vertical stand S, and the half bearings $G^2$, $G^3$ pressed against the rods by the springs or flexible plates $H^2$, $H^3$. $Y^6$ designates a counter-weight attached to the rod $A^6$ and adapted to bring the center of gravity in the line between the two rods Q', R'.

In the modified construction illustrated in Fig. 7, a single carbon or other suitable rod $Q^2$ is arranged co-axially with and attached to the rod $A^7$ and the split bearings are arranged horizontally at each end of the carbon rod $Q^2$, the half bearings $U^4$, $U^5$ being fixed to the vertical stand $S^6$, and the opposite half bearings $G^4$, $G^5$ being pressed against the rod by the springs $H^4$, $H^5$.

The modified construction illustrated in Fig. 8 of the drawings comprises two half bearings $U^6$, $U^7$, each one being fixed to a vertical stand $S^2$, $S^3$, and supporting between them a carbon rod $Q^3$ fixed to the magnet $A^8$, so that the weight of the latter presses the carbon rod $Q^3$ against the fixed bearings $U^6$, $U^7$. The magnetic force in this case is only measured by the variation of intensity of current passing through either half bearing.

Again, as an alternative to the construction illustrated in Figure 1, a modified construction like that shown in Fig. 9 may be employed. This construction comprises magnets $A^9$ and $B^9$ co-axially arranged and connected closely one behind the other, the pivot $E^9$ being disposed between the adjacent poles of the magnets $A^9$, $B^9$, and the bars $C^9$ being symmetrically arranged at each side of the pole N of the magnet B. In this case only the two outside poles will tend to deflect the pivoted system of magnets in opposite directions.

A still further modified form of apparatus is illustrated in Figs. 10 and 11. This consists of a pivoted magnet $A^{10}$ with magnets $B^{10}$ rigidly connected thereto and arranged at opposite sides thereof. $E^{11}$ designates the pivotal axis of the magnet $A^{10}$, and $C^{10}$ are iron bars symmetrically disposed at each side of the magnet B at right angles thereto. Associated with one end of the magnet $A^{10}$ are magnets or coils $D^{10}$, and $F^{10}$ is a soft iron bar disposed across one end of the magnet $A^{10}$ at right angles thereto. The magnet $A^{10}$ at the other side of its pivotal axis is provided with a counterweight $Y^{10}$.

Another embodiment of the invention is shown diagrammatically in Fig. 14. The apparatus, shown in this instance, is astatic to earth in both planes, but will measure the magnetic force of any source of magnetism. $A^{14}$ designates a magnet supported in gimbals $A^{15}$, $A^{16}$. $C^{14}$ and $C^{15}$ designate pairs of soft iron bars symmetrically arranged at opposite sides of the magnet $A^{14}$ at each side of the pivotal axis thereof, said pairs of bars being arranged in planes at right angles to each other. $F^{14}$ designates soft iron bars disposed across opposite ends and at right angles to the magnet $A^{14}$. $M^{14}$, $M^{15}$ are pairs of microphones disposed about one end of the magnet $A^{14}$ in planes at right angles to each other, and $G^{14}$, $G^{15}$ are galvanometers that are connected with the microphones $M^{14}$, and a battery $H^{14}$, or other suitable source of electrical energy through the medium of circuit connections $H^{15}$, and adapted to measure and indicate the differences of intensity of the current supplied to the pairs of microphones.

What I claim as my invention and desire to secure by Letters Patent of the United States is:—

1. In apparatus for detecting and measuring weak magnetic forces, the combination of a magnet, means for rendering the said magnet astatic to earth, oppositely directed abutments against which said magnet will exert variable pressure under the influence of deflecting magnetic force, means for causing an electrical current to pass through said abutments whereby the intensity of the current is subjected to variation corresponding to the variations of pressure on the abutments, and means for giving indication of such current variations.

2. In apparatus for detecting and measuring weak magnetic forces, the combination of a magnet, means comprising soft iron masses and a counterweight for rendering the said magnet astatic to earth, oppositely directed abutments against which said magnet will exert variable pressure under the influence of deflecting magnetic force, means for causing an electrical current to pass through said abutments whereby the intensity of the current is subjected to variation corresponding to the variations of pressure on the abutments, and means for giving indication of such current variations.

3. In apparatus for detecting and measuring weak magnetic forces, the combination of a magnet, means for rendering the said magnet astatic to earth, electrically conductive rods attached to said magnet, oppositely divided abutments against which said rods will exert variable pressure under the influence of deflecting magnetic force, means for causing an electrical current to pass through said abutments whereby the intensity of the current is subjected to variation corresponding to the variations of pressure on the abutments, and means for giving indication of such current variations.

4. In an apparatus for detecting and measuring weak magnetic forces, the combination of a magnet, means for rendering the said magnet astatic to earth, oppositely directed abutments in two planes at right angles to each other against which said magnet will exert variable pressure under the influence of deflecting magnetic force, means for causing electrical currents to pass through said abutments in each plane respectively whereby the intensity of the currents is subjected to variation corresponding to the variations of pressure on the abutments, and means for giving indications of such current variations.

In witness whereof I have signed this specification in the presence of two witnesses.

JULIO LOPES VALENTE da CRUZ.

Witnesses:
A. MITCHINSON,
C. A. WALTER.